(12) United States Patent
Weber et al.

(10) Patent No.: US 11,752,702 B2
(45) Date of Patent: Sep. 12, 2023

(54) METHOD FOR WELDING MEMBRANES

(71) Applicant: BASF SE, Ludwigshafen am Rhein (DE)

(72) Inventors: Martin Weber, Ludwigshafen (DE); Juergen Ahlers, Ludwigshafen (DE); Frank Prissok, Lemfoerde (DE); Oliver Gronwald, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 528 days.

(21) Appl. No.: 16/640,505

(22) PCT Filed: Aug. 30, 2018

(86) PCT No.: PCT/EP2018/073352
§ 371 (c)(1),
(2) Date: Feb. 20, 2020

(87) PCT Pub. No.: WO2019/043100
PCT Pub. Date: Mar. 7, 2019

(65) Prior Publication Data
US 2020/0353697 A1    Nov. 12, 2020

(30) Foreign Application Priority Data
Sep. 1, 2017   (EP) .................................. 17189070

(51) Int. Cl.
*B29D 99/00*     (2010.01)
*B29C 65/00*     (2006.01)
(Continued)

(52) U.S. Cl.
CPC .............. *B29C 66/71* (2013.01); *A43B 7/125* (2013.01); *B29C 65/38* (2013.01);
(Continued)

(58) Field of Classification Search
CPC ................................ B29C 65/38; B29C 66/71
See application file for complete search history.

(56) References Cited

U.S. PATENT DOCUMENTS 3,953,566 A   4/1976   Gore
3,962,153 A   6/1976   Gore
(Continued)

FOREIGN PATENT DOCUMENTS

CN    104592719       5/2015
DE    697 26 014 T2   9/2004
(Continued)

OTHER PUBLICATIONS

International Preliminary Report on Patentability and Written Opinion dated Mar. 5, 2020 in PCT/EP2018/073352, 2 pages.
(Continued)

*Primary Examiner* — Scott W Dodds
(74) *Attorney, Agent, or Firm* — Grüneberg and Myers, PLLC (57) ABSTRACT

A process for welding porous membranes, the process containing i) providing first and second porous membranes; ii) at least partially superimposing the first and second porous membranes to obtain an at least partial superimposition region; iii) welding the first and second porous membranes at least in a portion of the at least one superimposition region at a temperature in the range from 100 to 300° C. to obtain an at least partially welded composite of the first and second porous membranes, wherein the first and second porous membranes are made of at least one thermoplastic elastomer selected from the group consisting of a polyurethane elastomer, a polyester elastomer, a polyetherester elastomer, a polyesterester elastomer, a polyamide elastomer, a polyetheramide elastomer, a polystyrene elastomer, and an ethylene-vinyl acetate elastomer, and wherein the
(Continued)

first and second porous membranes have pores having an average pore diameter of less than 2000 nm.

10 Claims, 1 Drawing Sheet

(51) Int. Cl.
  *A43B 7/12*   (2006.01)
  *B29C 65/38*   (2006.01)
  *B29C 65/82*   (2006.01)
  *B32B 25/04*   (2006.01)
  *B32B 25/14*   (2006.01)
  *B29L 7/00*   (2006.01)
  *B29L 31/50*   (2006.01)

(52) U.S. Cl.
  CPC .... *B29C 65/8253* (2013.01); *B29C 66/00141* (2013.01); *B29C 66/1122* (2013.01); *B29C 66/727* (2013.01); *B29C 66/7352* (2013.01); *B29C 66/919* (2013.01); *B29C 66/949* (2013.01); *B29D 99/005* (2013.01); *B32B 25/042* (2013.01); *B32B 25/14* (2013.01); *B29L 2007/005* (2013.01); *B29L 2031/501* (2013.01); *B32B 2307/724* (2013.01); *B32B 2437/00* (2013.01)

(56) References Cited

U.S. PATENT DOCUMENTS

| | | | | |
|---|---|---|---|---|
| 4,695,484 | A * | 9/1987 | Tanaka | .................... D06N 3/047 |
| | | | | 427/338 |
| 5,013,339 | A * | 5/1991 | Mahoney | ............... B01D 71/34 |
| | | | | 96/10 |
| 5,562,977 | A | 10/1996 | Jager et al. | |
| 5,650,225 | A * | 7/1997 | Dutta | .................... B29C 41/003 |
| | | | | 428/36.1 |
| 6,279,745 | B1 * | 8/2001 | Huynen | .................. B29C 65/18 |
| | | | | 206/439 |
| 6,914,018 | B1 | 7/2005 | Uitenbroek et al. | |
| 2002/0192454 | A1 * | 12/2002 | Takata | ............... B01D 67/0027 |
| | | | | 428/315.7 |
| 2007/0124849 | A1 * | 6/2007 | Williams | .............. B32B 27/322 |
| | | | | 2/275 |
| 2011/0097536 | A1 | 4/2011 | Jokisch et al. | |
| 2011/0271416 | A1 * | 11/2011 | Sturgill | ..................... B32B 5/16 |
| | | | | 2/243.1 |
| 2012/0227164 | A1 * | 9/2012 | Komoriya | ............ A41D 27/245 |
| | | | | 2/400 |
| 2012/0322328 | A1 | 12/2012 | Yamada et al. | |
| 2015/0230563 | A1 | 8/2015 | Bacino et al. | |
| 2016/0107417 | A1 | 4/2016 | Morlacchi | |

FOREIGN PATENT DOCUMENTS

| | | |
|---|---|---|
| EP | 1 085 982 B1 | 11/2002 |
| EP | 2 476 324 A1 | 7/2012 |
| EP | 3 100 849 A1 | 12/2016 |
| GB | 2496244 A | 5/2013 |
| JP | 5005276 B2 | 8/2012 |
| WO | WO 2014/035803 A1 | 3/2014 |
| WO | WO 2016/061321 A1 | 4/2016 |

OTHER PUBLICATIONS

International Preliminary Report on Patentability and Written Opinion dated Mar. 5, 2020 in PCT/EP2018/073352, 8 pages.
Anonymus: "Membran (Trennschicht)—Wikipedia",XP055607414, Jun. 16, 2016 retrieved from the Internet.
Carl Hanser Verlag, "Kunststoffhandbuch, 7, Polyurethane", [Plastics Handbook, 7, Polyurethanes], 3rd edition 1993, section 3.1., pp. 57-75.
Carl Hanser Verlag, "Kunststoffhandbuch" [Plastics Handbook], vol. 7, published by Vieweg und Höchtlen, Munich 1966, pp. 103-113.
Extended European Search Report dated Mar. 20, 2020 in European Patent Application No. 19208653.6.

* cited by examiner

METHOD FOR WELDING MEMBRANES

The present invention relates to a process for welding porous membranes, comprising providing a porous membrane and a sheetlike support material; at least partially superimposing porous membrane and sheetlike support material to obtain an at least partial superimposition region; and also welding porous membrane and support material at least in a portion of the superimposition region at a temperature in the range from 100 to 300° C. to obtain an at least partially welded composite of porous membrane and sheetlike support material. The invention further relates to a welded composite of a porous membrane and a support material, obtained or obtainable by the process according to the invention and also to the use of a welded composite for the production of an article selected from the group consisting of clothing, shoes, boots, protective clothing, tents and tarpaulins.

Waterproof, breathable clothing and shoes normally comprise, as functional layer, expanded polytetrafluoroethylene (ePTFE) (U.S. Pat. Nos. 3,953,566, 3,962,153) or polyester (Sympatex) (U.S. Pat. No. 5,562,977) in the form of membranes or thin films. Non-porous coatings of thermoplastic polyurethane on textiles have also been disclosed (JP 5005276). The problem here is that the functional layer usually needs to be sewn onto the support material, with the seam stitches rendering the material of the functional layer permeable to water (US 2015/0230563). The water resistance must therefore typically be established subsequently by sealing the seam with an overlying adhesive or a sealing tape, with the sealing being effected by means of a bonding or welding process. Alternatives to sewing are to date not known and methods such as for example planar adhesive bonding are accompanied by disadvantages, for instance the functional materials lose their breathability as a result of planar adhesive bonding and over the course of time detachment phenomena arise, etc.

The object of the invention was therefore that of providing a process which permits the joining of breathable yet waterproof materials without these materials losing these advantageous properties; in particular the intention was to provide a process which permits the bonding of these materials without using seam stitches, in turn preserving the advantageous properties of the materials.

This object is achieved according to the invention by a process for welding porous membranes, comprising:
i) providing a porous membrane and a sheetlike support material;
ii) at least partially superimposing porous membrane and sheetlike support material as per i) to obtain an at least partial superimposition region;
iii) welding porous membrane and support material at least in a portion of the superimposition region as per ii) at a temperature in the range from 100 to 300° C. to obtain an at least partially welded composite of porous membrane and sheetlike support material.

In accordance with DIN ISO 857-1 (formerly DIN 1910-1), welding is understood to mean the non-detachable joining of components using heat or pressure (with or without welding fillers).

Depending on the welding process, the join is effected in a weld seam or weld spot. The energy required for the welding is always supplied from the outside. Within the context of the present invention, "welding" is understood to mean the non-detachable joining or the creation of a non-detachable join of porous membrane and support material. This is understood to mean that, in accordance with DIN ISO 527-3, in the region of the weld (weld seam) the weld seam has a breaking stress in the range from 0.2 to 10 MPa, preferably in the range from 0.5 to 5 MPa, more preferably in the range from 1 to 2 MPa, before separation of porous membrane and support material occurs. The corresponding elongation at break of the porous membrane is in the range from 5% to 200%, more preferably in the range from 5% to 100%.

Surprisingly, a welded composite produced in this way has the same good water vapor permeability and the same high liquid entry pressure as the unwelded porous membrane itself, in particular even in the immediate area of the weld (weld seam).

A preferred embodiment therefore relates to a process for welding porous membranes, comprising:
i) providing a porous membrane and a sheetlike support material;
ii) at least partially superimposing porous membrane and sheetlike support material as per i) to obtain an at least partial superimposition region;
iii) welding porous membrane and support material at least in a portion of the superimposition region as per ii) at a temperature in the range from 100 to 300° C. to obtain an at least partially welded composite of porous membrane and sheetlike support material having a weld seam, wherein the weld seam has a breaking stress in the range from 0.2 to 10 MPa, preferably in the range from 0.5 to 5 MPa, more preferably in the range from 1 to 2 MPa, and the porous membrane preferably has an elongation at break in the range from 5% to 200%, preferably in the range from 5% to 100%.

Welding as Per iii)

In iii) of the present invention, porous membrane and support material are welded at least in a portion of the superimposition region as per ii) at a temperature in the range from 100 to 300° C. to obtain an at least partially welded composite of porous membrane and sheetlike support material. The welding as per iii) is preferably effected for a period of time in the range from 0.1 seconds to 10 minutes, more preferably in the range from 0.5 seconds to 60 seconds, more preferably in the range from 1 to 10 seconds.

The welding as per iii) is preferably effected under an atmosphere selected from protective gas, especially argon or nitrogen, air or lean air, more preferably under air.

The welding as per iii) is preferably effected at a pressure in the range from 1 to 10 bar, more preferably in the range from 2 to 8 bar, more preferably in the range from 3 to 5 bar. The welding as per iii) is effected at a temperature in the range from 100 to 300° C., preferably in the range from 150 to 250° C.

All welding apparatuses known to those skilled in the art and suitable for the welding of porous membranes can be used for the welding. Examples that can be mentioned include common film welders, such as for example automatic or semiautomatic pulse welding machines.

As mentioned above, a welded composite produced in this way has the same good water vapor permeability and the same high liquid entry pressure as the unwelded porous membrane itself, in particular even in the immediate area of the weld (weld seam). The expression "the same good water vapor permeability" in the context of the present invention means that the water vapor permeability of the at least partially welded composite obtained as per (iii) is in the range from 75% to 100%, preferably in the range from 80% to 100%, more preferably in the range from 90% to 100%, based on the water vapor permeability of the porous membrane provided as per (i). This applies to the entire at least partially welded composite obtained as per (iii), and especially in the area of the weld seam. The expression "the same high liquid entry pressure" in the context of the present invention means that the liquid entry pressure of the at least partially welded composite obtained as per (iii) is in the range from 75% to 100%, preferably in the range from 80% to 100%, more preferably in the range from 90% to 100%, based on the liquid entry pressure of the porous membrane provided as per (i). This applies to the entire at least partially welded composite obtained as per (iii), and especially in the area of the weld seam.

Porous Membrane

A porous membrane is provided in i). The glass transition temperature Tg of the porous membrane is preferably in the range from −40 to 120° C.

The porous membrane preferably has an average thickness in the range from 5 to 150 μm, more preferably in the range from 50 to 100 μm, more preferably in the range from 70 to 90 μm.

A preferred embodiment therefore relates to a process for welding porous membranes, comprising:
i) providing a porous membrane and a sheetlike support material;
ii) at least partially superimposing porous membrane and sheetlike support material as per i) to obtain an at least partial superimposition region;
iii) welding porous membrane and support material at least in a portion of the superimposition region as per ii) at a temperature in the range from 100 to 300° C., preferably in the range from 150 to 300° C., to obtain an at least partially welded composite of porous membrane and sheetlike support material;
wherein the porous membrane has an average thickness in the range from 5 to 150 μm, more preferably in the range from 50 to 100 μm, more preferably in the range from 70 to 90 μm.

Preferably, the porous membrane has pores having an average pore diameter of less than 2000 nm, more preferably in the range from 0.001 μm to 0.8 μm, determined by means of Hg porosimetry in accordance with DIN 66133.

A preferred embodiment therefore relates to a process for welding porous membranes, comprising:
i) providing a porous membrane and a sheetlike support material;
ii) at least partially superimposing porous membrane and sheetlike support material as per i) to obtain an at least partial superimposition region;
iii) welding porous membrane and support material at least in a portion of the superimposition region as per ii) at a temperature in the range from 100 to 300° C., preferably in the range from 150 to 250° C., to obtain an at least partially welded composite of porous membrane and sheetlike support material;
wherein the porous membrane has pores having an average pore diameter of less than 2000 nm, preferably in the range from 0.001 μm to 0.8 μm, determined by means of Hg porosimetry in accordance with DIN 66133.

A particularly preferred embodiment relates to a process for welding porous membranes, comprising:
i) providing a porous membrane and a sheetlike support material;
ii) at least partially superimposing porous membrane and sheetlike support material as per i) to obtain an at least partial superimposition region;
iii) welding porous membrane and support material at least in a portion of the superimposition region as per ii) at a temperature in the range from 100 to 300° C., preferably in the range from 150 to 250° C., to obtain an at least partially welded composite of porous membrane and sheetlike support material;
wherein the porous membrane has an average thickness in the range from 5 to 150 μm, more preferably in the range from 50 to 100 μm, more preferably in the range from 70 to 90 μm; and wherein the porous membrane has pores having an average pore diameter of less than 2000 nm, preferably in the range from 0.001 μm to 0.8 μm, determined by means of Hg porosimetry in accordance with DIN 66133.

The material of the porous membrane preferably comprises a thermoplastic elastomer, more preferably selected from the group consisting of polyurethane elastomer, polyester elastomer, polyetherester elastomer, polyesterester elastomer, polyamide elastomer, polyetheramide elastomer, polystyrene elastomer, ethylene-vinyl acetate elastomer and mixtures of two or more of these elastomers, more preferably a polyurethane elastomer.

A preferred embodiment therefore relates to a process for welding porous membranes, comprising:
i) providing a porous membrane and a sheetlike support material;
ii) at least partially superimposing porous membrane and sheetlike support material as per i) to obtain an at least partial superimposition region;
iii) welding porous membrane and support material at least in a portion of the superimposition region as per ii) at a temperature in the range from 100 to 300° C., preferably in the range from 150 to 250° C., to obtain an at least partially welded composite of porous membrane and sheetlike support material;
wherein the material of the porous membrane comprises a polyurethane elastomer.

A particularly preferred embodiment relates to a process for welding porous membranes, comprising:
i) providing a porous membrane and a sheetlike support material;
ii) at least partially superimposing porous membrane and sheetlike support material as per i) to obtain an at least partial superimposition region;
iii) welding porous membrane and support material at least in a portion of the superimposition region as per ii) at a temperature in the range from 100 to 300° C., preferably in the range from 150 to 250° C., to obtain an at least partially welded composite of porous membrane and sheetlike support material;
wherein the material of the porous membrane comprises a polyurethane elastomer;
wherein the porous membrane has an average thickness in the range from 5 to 150 μm, more preferably in the range from 50 to 100 μm, more preferably in the range from 70 to 90 μm; and/or, preferably and,
wherein the porous membrane has pores having an average pore diameter of less than 2000 nm, preferably in the range from 0.001 μm to 0.8 μm, determined by means of Hg porosimetry in accordance with DIN 66133.

The material of the porous membrane preferably comprises a polyurethane elastomer based on the following components:
80% to 100% by weight of a mixture of at least one diol (D1) and at least one isocyanate (I1),
0 to 20% by weight of at least one compound (C1) having at least two isocyanate-reactive groups;
wherein the porous membrane preferably has pores having an average pore diameter in the range from 0.001 μm to 0.8 μm, determined by means of Hg porosimetry in accordance with DIN 66133.

In the context of the present invention, the sum total of the % by weight of the components on which the polyurethane elastomer is based amounts to 100% by weight. In addition, the polyurethane elastomer can comprise further additives.

In the context of the present invention, a membrane is understood to be a thin, semipermeable structure which is capable of separating two liquids or molecular and/or ionic components or particles from a liquid. A membrane acts as a selective barrier which permits the passage of some particles, substances or chemicals, while retaining others. For example, a membrane may be a reverse osmosis (RO) membrane, a forward osmosis (FO) membrane, nanofiltration (NF) membrane, ultrafiltration (UF) membrane or a microfiltration (MF) membrane.

The pore size distribution within the membrane is preferably not homogeneous; the membrane preferably comprises pores having various pore sizes. The pore size distribution preferably has a gradient across the diameter of the membrane, with a gradient within the context of the invention being understood to mean that pores on a first surface of the membrane or close to this surface have an average pore diameter which differs from the average pore diameter of a second surface or close to this second surface. Within the context of the present invention, it is for example possible that the pores at or close to the first surface have an average pore diameter in the range from 0.001 µm to 0.01 µm, determined by means of Hg porosimetry in accordance with DIN 66133, and that the pores at or close to the second surface have an average pore diameter in the range from 0.1 µm to 0.8 µm, determined by means of Hg porosimetry in accordance with DIN 66133. The degree of the gradient of the pore diameter within the membrane can vary within wide ranges. The ratio of the pore diameter of pores at or close to the first surface of the membrane to that of the pores at or close the second surface may for example be in the range from 1:5 to 1:10 000, preferably in the range from 1:10 to 1:1000, more preferably in the range from 1:100 to 1:500. In a preferred embodiment, the pore size distribution of the porous membrane has a gradient across the diameter of the membrane.

In a preferred embodiment, explained at the outset, the material of the porous membrane comprises a polyurethane elastomer (P1) based on the following components:
  80% to 100% by weight of a mixture of at least one diol (D1) and at least one isocyanate (I1),
  0 to 20% by weight of at least one compound (C1) having at least two isocyanate-reactive groups;
  wherein the porous membrane preferably has pores having an average pore diameter in the range from 0.001 µm to 0.8 µm, determined by means of Hg porosimetry in accordance with DIN 66133.

The polyurethane therefore comprises no, or only small amounts of, compound (C1) and consists predominantly of a mixture of diol (D1) and polyisocyanate (I1). The polyurethane (PU1) is preferably based on 85% to 100% by weight of a mixture of at least one diol (D1) and at least one polyisocyanate (I1) and also 0 to 15% by weight of at least one compound (C1) having at least two isocyanate-reactive groups, more preferably 90% to 99.9% by weight of a mixture of at least one diol (D1) and at least one polyisocyanate (I1) and also 0.1% to 10% by weight of at least one compound (C1) having at least two isocyanate-reactive groups.

The molar ratio of the at least one diol (D1) and the at least one polyisocyanate (I1) is typically in the range from 95:100 to 100:95. The molar ratio of the at least one diol (D1) and the at least one polyisocyanate (I1) is preferably in the range from 98:100 to 100:98, more preferably in the range from 99:100 to 100:99.

The membrane may comprise further compounds, such as for example further polyurethanes. By way of example, the membrane can comprise a further polyurethane (PU2), which may be a thermoplastic polyurethane. In a preferred embodiment, the porous membrane therefore comprises a further polyurethane (PU2) based on at least one polyol (P2), at least one diol (D2) and at least one polyisocyanate (I2).

In general, the membrane comprises at least 80% by weight of polyurethane (PU1), preferably at least 85% by weight of polyurethane (PU1), more preferably at least 90% by weight of polyurethane (PU1). For example, the membrane can comprise polyurethane (PU1) in an amount in the range from 80% to 100% by weight, more preferably in the range from 85% to 99% by weight, more preferably in the range from 90% to 95% by weight.

The polyurethane (PU1) is based here on 80% to 100% by weight of a mixture of at least one diol (D1) and at least one polyisocyanate (I1) and also 0 to 20% by weight of at least one compound (C1) having at least two isocyanate-reactive groups.

The compound (C1) can be any compound having at least two isocyanate-reactive groups. The isocyanate-reactive groups are preferably hydroxy or amino groups. The compound (C1) can be added to modify the properties of the polyurethane (PU1). Any compound can be used as long as it is suitable for producing a polyurethane (PU1) with the mixture of the at least one diol (D1) and the at least one polyisocyanate (I1). For example, the compound (C1) can be a polyol, or alternatively a polymer having at least two hydroxy groups or at least two amino groups other than a polyol, for example a hydrophobic polymer or oligomer comprising silicon.

The compound (C1) is preferably a polyol, more preferably selected from the group of the divalent radicals of an oligosiloxane or polysiloxane of general formula I -[Ak-O]$_q$-Ak-Si(R$_2$)—[O—Si(R$_2$)]$_p$—O—Si(R$_2$)-Ak-[O-Ak]$_{q'}$-  (I)

where Ak is $C_2$-$C_4$ alkylene and R is $C_1$-$C_4$ alkyl and each of p, q and q' is independently a number in the range from 0-50, with p more preferably being a number in the range from 1 to 50, more preferably in the range from 2 to 50. Ak can be identical alkylene units in each (C1), but Ak can also be different alkylene units within the same radical (C1). Ak can for example be ethylene or propylene within the same radical (C1).

In one embodiment, (C1) is a polydimethylsiloxane of general formula (II)

(II)

where m is in the range from 5 to 80. In a further embodiment, (C1) is a polydimethylsiloxane of general formula (III)

where n and m are each in the range from 5 to 80.

In a further embodiment, compound (C1) is a polyol. All suitable polyols are usable here, for example polyether diols or polyester diols, or mixtures of two or more thereof. Suitable polyether polyols or polyether diols are by way of example polyether diols based on ethylene oxide or propylene oxide or mixtures thereof, for example copolymers such as block copolymers. In addition, any suitable polyester diol can be used, with polyester diol also comprising polycarbonate diols here.

The composition and the properties of the porous membrane can be varied depending on the application. For example, the thickness of the membrane can be varied within a wide range.

The porous membrane has a liquid entry pressure (LEP) determined in accordance with DIN EN 20811 in the range from 1 to 5 bar, preferably in the range from 3 to 4 bar. The water vapor permeability (WVP) determined in accordance with DIN 53122 at 38° C. and 90% relative humidity is more than 1000 [g/m$^2$*d].

The polyurethane (PU1) is based on 80% to 100% by weight of a mixture of at least one diol (D1) and at least one polyisocyanate (I1). Polyurethane (PU2), which may also be present in the porous membrane, is based on at least one polyol (P2), at least one diol (D2) and at least one polyisocyanate (I2).

Polyisocyanate (I1) and polyisocyanate (I2) are the same or different. Polyisocyanates (I1), (I2) that may be used are aliphatic, cycloaliphatic, araliphatic and/or aromatic diisocyanates. Examples that may be mentioned are the following aromatic isocyanates: toluene 2,4-diisocyanate, mixtures of toluene 2,4-and 2,6-diisocyanate, diphenylmethane 4,4'-, 2,4'- and/or 2,2'-diisocyanate (MDI), mixtures of diphenylmethane 2,4'- and 4,4'-diisocyanate, urethane-modified liquid diphenylmethane 4,4'- and/or 2,4'-diisocyanate, 4,4'-diisocyanatodiphenylethane, mixtures of monomeric methanediphenyl diisocyanates and other highly polycyclic homologs of methanediphenyl diisocyanate (polymeric MDI), naphthylene 1,2-and 1,5-diisocyanate.

Aliphatic diisocyanates are customary aliphatic and/or cycloaliphatic diisocyanates, for example tri-, tetra-, penta-, hexa-, hepta-, and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4-and/or 1,3-bis(isocyanatomethyl)cyclohexane (HXDI), cyclohexane 1,4-diisocyanate, 1-methylcyclohexane 2,4-and/or 2,6-diisocyanate, dicyclohexylmethane 4,4'-, 2,4'- and/or 2,2'-diisocyanate.

Polyisocyanate prepolymers can be obtained by means of reaction of the above-described polyisocyanates in excess, for example at temperatures in the range from 30 to 100° C., preferably at more than 80° C., with polyols to obtain the prepolymer. For the preparation of the prepolymer, preference is given to using polyisocyanates and commercially available polyols based on polyesters, proceeding for example from adipic acid, or on polyethers, proceeding for example from ethylene oxide and/or propylene oxide.

Polyols are known to those skilled in the art and described for example in "Kunststoffhandbuch, 7, Polyurethane" [Plastics Handbook, 7, Polyurethanes], Carl Hanser Verlag, 3rd edition 1993, section 3.1. Polyols which are preferably used are polymeric compounds having hydrogen atoms which are reactive toward isocyanates. Particularly preferred polyols are polyetherols.

In the preparation of the polyisocyanate prepolymers, customary chain extenders or crosslinking agents can optionally be added to the polyols. Preferred chain extenders are butane-1,4-diol, dipropylene glycol and/or tripropylene glycol. In this case, the ratio of the organic polyisocyanates to polyols and chain extenders is preferably selected such that the isocyanate prepolymer has an NCO content in the range from 2% to 30%, more preferably in the range from 6% to 28%, more preferably in the range from 10% to 24%.

The at least one polyisocyanate (I1), (I2) is preferably selected from the group consisting of aromatic araliphatic and aliphatic polyisocyanates, preferably from the group consisting of diphenylmethane diisocyanate (MDI), toluene diisocyanate (TDI) and hexamethylene diisocyanate (HDI). The polyisocyanate can be used in pure form or in the form of a composition, for example as an isocyanate prepolymer. In addition, a mixture comprising polyisocyanate and at least one solvent can be used, suitable solvents being known to those skilled in the art.

Diol (D1) and diol (D2) can be the same or different. In general, any diol can be used. Diol (D1) and diol (D2) are preferably selected from the group consisting of aliphatic, araliphatic, aromatic, and/or cycloaliphatic compounds having a molar mass in the range from 0.05 kg/mol to 0.499 kg/mol, preferably difunctional compounds, for example diamines and/or alkanediols having 2 to 10 carbon atoms in the alkylene portion, di-, tri-, tetra-, penta-, hexa-, hepta-, octa-, nona-, and/or decaalkylene glycols having from 3 to 8 carbon atoms, especially ethylene-1,2-glycol, propane-1, 3-diol, butane-1,4-diol, hexane-1,6-diol, and preferably corresponding oligo and/or polypropylene glycols such as diethylene glycol, dipropylene glycol, cyclohexane-1,4-diol, 1,4-dimethanolcyclohexane, and neopentyl glycol, and the use of mixtures is also possible. The diols preferably have solely primary hydroxy groups, with particular preference being given to ethanediol, butanediol and hexanediol. Diol (D1)/diol (D2) is therefore preferably selected from the group consisting of ethanediol, butanediol and hexanediol.

In the preparation of the polyurethane (PU1) and/or polyurethane (PU2), further compounds such as for example catalysts and/or customary auxiliaries and/or additives may be used.

Customary auxiliaries are for example surface-active substances, fillers, flame retardants, nucleating agents, oxidation stabilizers, lubricants and mold release aids, dyes, pigments and optionally stabilizers, for example for protection against hydrolysis, light, heat or discoloration, inorganic and/or organic fillers, reinforcers and plasticizers. Customary auxiliaries and additives can be found for example in the "Kunststoffhandbuch" [Plastics Handbook], volume 7, published by Vieweg and Höchtlen, Carl Hanser Verlag, Munich 1966 (pages 103-113).

A polyol (P2) is a further component used in the preparation of the polyurethane (PU2). Polyol (P2) is preferably a diol. Any suitable diol can be used, for example polyether diols or polyester diols, or mixtures of two or more thereof.

Suitable polyether diols are by way of example polyether diols based on ethylene oxide or propylene oxide or mixtures thereof, for example copolymers such as block copolymers. The ratio of the ethylene oxide units to propylene units can be varied within a wide range and can for example be in the range from 50:50 to 95:5, preferably in the range from 60:40 to 90:10, more preferably in the range from 70:30 to 85:15, more preferably in the range from 75:25 to 80:20. The molecular weight of the polyether diols is for example in the range from 1000 to 4000 daltons, preferably in the range from 1500 to 3000 daltons, more preferably in the range from 2000 to 2500 daltons.

In addition, any suitable polyester diol can be used, with polyester diol also comprising polycarbonate diols here.

Suitable polyester diols can be produced from organic dicarboxylic acids having 2 to 12 carbon atoms, preferably aromatic dicarboxylic acids having 8 to 12 carbon atoms, and from polyhydric alcohols, preferably diols having 2 to 12 carbon atoms, preferably from 2 to 6 carbon atoms. Examples of dicarboxylic acids are: succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomeric naphthalenedicarboxylic acids. The dicarboxylic acid can be used alone or in a mixture. Instead of the free dicarboxylic acid, it also possible to use a corresponding dicarboxylic acid derivative, for example dicarboxylic esters of alcohols having 1 to 4 carbon atoms, or dicarboxylic anhydrides. Examples of dihydric and polyhydric alcohols, especially diols, are ethanediol, diethylene glycol, propane-1,2-and -1,3-diol, dipropylene glycol, butane-1,4-diol, pentane-1,5-diol, hexane-1,6-diol, decane-1,10-diol, glycerol, and trimethylolpropane, preferably ethylene glycol, propane-1,3-diol, methylpropane-1,3-diol, butane-1,4-diol, 3-methylpentane-1,5-diol, or hexane-1,6-diol. Examples of other compounds that are suitable are polyester diols derived from lactones such as epsilon-caprolactone, or hydroxycarboxylic acids, for example omega-hydroxycaproic acid and hydroxybenzoic acids.

Production of the Porous Membrane

The porous membrane is produced by a process comprising:

(a) providing a solution (L1) comprising at least one polyurethane (PU1);

(b) producing the membrane from the solution (L1) as per (a) by means of phase inversion.

The porous membrane in the process obtains pores having an average pore diameter in the range from 0.001 μm to 0.8 μm, determined by means of Hg porosimetry in accordance with DIN 66133.

The porous membrane in the process preferably obtains a gradient across the diameter of the membrane with respect to the pore size distribution.

The solution (L1) comprising at least one polyurethane (PU1) is provided according to (a). The solution (L1) comprises polyurethane (PU1) and at least one suitable solvent or a solvent mixture. Suitable solvents are for example selected from the group of organic, in particular aprotic polar solvents. Suitable solvents have a boiling point in the range from 80 to 320° C., preferably from 100 to 280° C., more preferably from 150 to 250° C. Suitable aprotic polar solvents are for example high-boiling esters, ketones, asymmetrically halogenated hydrocarbons, anisole, N,N-dimethylformamide, N,N-dimethylacetamide, dimethyl sulfoxide, sulfolane, N,N-dimethyl-2-hydroxypropanamide, N,N-diethyl-2-hydroxypropanamide, N,N-dimethyl-2-methoxypropanamide, N,N-diethyl-2-methoxypropanamide, N-formylpyrrolidine, N-acetylpyrrolidine, N-formylpiperidine, N-acetylpiperidine, N-formylmorpholine, N-acetylmorpholine, N-methyl-2-pyrrolidone and/or N-ethyl-2-pyrrolidone. Mixtures of two or more of these solvents can also be used.

Particular preference is given to N-methylpyrrolidone as solvent for the solution (L1). The solution (L1) can include polyurethane (PU1) in an amount sufficient for the formation of a film from the solution. The solution (L1) for example comprises from 10% to 35% by weight of polyurethane (PU1), preferably from 15% to 25% by weight.

The solution (L1) can be produced at elevated temperatures.

According to (b), the porous membrane is created from the solution (L1) by means of phase inversion. Suitable methods are known to those skilled in the art. A non-solvent-induced phase inversion is preferably performed. Step (b) may by way of example comprise steps (b-a) and (b-b):

(b-a) forming a film from the solution (L1);

(b-b) contacting the film of (b-a) with a mixture (L2).

According to (b-a), a film is created from the solution (L1) by means of methods known to those skilled in the art. This film is then contacted as per (b-b) with a mixture (L2).

Step (b) induces coagulation and membranes are obtained. The mixture (L2) can comprise any compound which is suitable for inducing coagulation. The mixture (L2) has a lower solubility for polyurethane (PU1) than the solvent used for the production of (L1). In particular, non-solvents such as for example water or mixtures comprising water are used. Suitable coagulants comprise, for example, liquid water, water vapor, alcohols or mixtures thereof. Preferred alcohols as coagulants in (L2) are mono-, di- or trialkanols having no further functional groups, such as isopropanol, ethylene glycol or propylene glycol.

Step (b), in particular steps (b-a) and/or (b-b), can be performed at elevated temperatures.

Solution (L1) comprises at least one polyurethane (PU1), but can also comprise further compounds or additives. In one embodiment, (L1) also comprises polyurethane (PU2). The solution (L1) can likewise comprise additives such as polyhydroxy compounds such as diols or triols. By way of example, additives can be selected from the group consisting of mono-, di- or trialkanols having no further functional groups, such as isopropanol, ethylene glycol, propylene glycol or propylenetriol (glycerol). Preference is given to using glycerol as additive in the solution (L1).

Support Material

According to (i) of the inventive process for welding porous membranes, a sheetlike support material is provided. "Sheetlike" means that the material has dimensions that extend in two dimensions.

In a preferred embodiment, the support material comprises a second porous membrane, the material of the second porous membrane comprising a thermoplastic elastomer selected from the group consisting of polyurethane elastomer, polyester elastomer, polyetherester elastomer, polyesterester elastomer, polyamide elastomer, polyetheramide elastomer, polystyrene elastomer, ethylene-vinyl acetate elastomer and mixtures of two or more of these elastomers, preferably polyurethane elastomer.

The second porous membrane preferably has an average thickness in the range from 5 to 150 µm, more preferably in the range from 50 to 100 µm, more preferably in the range from 70 to 90 µm. The second porous membrane preferably has pores having an average pore diameter of less than 2000 nm, preferably in the range from 0.001 µm to 0.8 µm, determined by means of Hg porosimetry in accordance with DIN 66133.

In a preferred embodiment, the material of the porous membrane as per i) and that of the second porous membrane comprise the same thermoplastic elastomer.

In a preferred embodiment, the invention therefore relates to a process for welding porous membranes, comprising:
i) providing a first porous membrane and a second porous membrane;
ii) at least partially superimposing first and second porous membrane as per i) to obtain an at least partial superimposition region;
iii) welding first and second porous membrane at least in a portion of the superimposition region as per ii) at a temperature in the range from 100 to 300° C., preferably in the range from 150 to 250° C., to obtain an at least partially welded composite of first and second porous membrane.

The second porous membrane is preferably created by the same process as described above for the (first) porous membrane.

In an alternative embodiment, the support material comprises a woven material, the woven material preferably being selected from polyamide or polyester or mixtures of polyamide and polyester.

Welded Composite

The invention further relates to a welded composite of a porous membrane and a support material, obtained or obtainable by the process described above.

A "welded composite of porous membrane and support material" is understood to mean a composite in which porous membrane and support material are at least partially superimposed and where porous membrane and support material are joined to one another in the form of a weld seam at least in a portion of the superimposition region. Surprisingly, a welded composite of this kind has the same good water vapor permeability and the same high liquid entry pressure as the unwelded porous membrane itself, in particular even in the immediate area of the weld seam. The "weld seam" in the context of the present invention means the region in which the porous membrane and support material have been welded, that is to say the region in which porous membrane and support material have been non-detachably joined to one another. "Nondetachable" (synonymous with inseparable) is understood to mean that, in accordance with DIN ISO 527-3, in the region of the weld seam the weld seam has a breaking stress in the range from 0.2 to 10 MPa, preferably in the range from 0.5 to 5 MPa, more preferably in the range from 1 to 2 MPa, before separation of porous membrane and support material occurs. The corresponding elongation at break of the porous membrane is in the range from 5% to 200%, more preferably in the range from 5% to 100%.

The expression "the same good water vapor permeability" in the context of the present invention means that the water vapor permeability of the at least partially welded composite obtained as per (iii) is in the range from 75% to 100%, preferably in the range from 80% to 100%, more preferably in the range from 90% to 100%, based on the water vapor permeability of the porous membrane provided as per (i). This applies to the entire at least partially welded composite obtained as per (iii), and especially in the area of the weld seam. The expression "the same high liquid entry pressure" in the context of the present invention means that the liquid entry pressure of the at least partially welded composite obtained as per (iii) is in the range from 75% to 100%, preferably in the range from 80% to 100%, more preferably in the range from 90% to 100%, based on the liquid entry pressure of the porous membrane provided as per (i). This applies to the entire at least partially welded composite obtained as per (iii), and especially in the area of the weld seam.

The welded composite obtained or obtainable preferably has, especially in the area of the weld seam, a water vapor permeability (WVP) which at 38° C. and 90% relative humidity according to DIN 53122 is more than 1000 [g/m$^2$*d]. Likewise, the welded composite obtained or obtainable preferably has, especially in the area of the weld seam, a watertightness (LEP) which is greater than 2 bar and preferably is in the range from 2 to 5 bar, more preferably in the range from 3 to 4 bar, determined according to DIN EN 20811.

The invention further relates to a welded composite of a porous membrane and a support material, wherein the porous membrane has an average thickness in the range from 5 to 150 µm, preferably in the range from 50 to 100 µm, more preferably in the range from 70 to 90 µm. In one embodiment, the porous membrane has pores having an average pore diameter of less than 2000 nm, preferably in the range from 0.001 µm to 0.8 µm, determined by means of Hg porosimetry in accordance with DIN 66133. A "welded composite of porous membrane and support material" is also understood here to mean a composite in which porous membrane and support material are at least partially superimposed and where porous membrane and support material are joined to one another in the form of a weld seam at least in a portion of the superimposition region. The "weld seam" in the context of the present invention means the region in which the porous membrane and support material have been welded, that is to say the region in which porous membrane and support material have been non-detachably joined to one another. "Non-detachable" (synonymous with inseparable) is understood to mean that, in accordance with DIN ISO 527-3, in the region of the weld seam the weld seam has a breaking stress in the range from 0.2 to 10 MPa, preferably in the range from 0.5 to 5 MPa, more preferably in the range from 1 to 2 MPa, before separation of porous membrane and support material occurs. The corresponding elongation at break of the porous membrane is in the range from 5% to 200%, more preferably in the range from 5% to 100%.

The material of the porous membrane preferably comprises a thermoplastic elastomer, more preferably selected from the group consisting of polyurethane elastomer, polyester elastomer, polyetherester elastomer, polyesterester elastomer, polyamide elastomer, polyetheramide elastomer, polystyrene elastomer, ethylene-vinyl acetate elastomer and mixtures of two or more of these elastomers, more preferably polyurethane elastomer. The material of the porous membrane preferably comprises a polyurethane elastomer (PU1) based on the following components:
 80% to 100% by weight of a mixture of at least one diol (D1) and at least one isocyanate (I1),
 0 to 20% by weight of at least one compound (C1) having at least two isocyanate-reactive groups; and wherein the porous membrane has pores having an average pore diameter in the range from 0.001 µm to 0.8 µm, determined by means of Hg porosimetry in accordance with DIN 66133.

The polyurethane elastomer (PU1) preferably comprises a further polyurethane (PU2) based on at least one polyol (P2), at least one diol (D2) and at least one polyisocyanate (I2).

With respect to details on PU1, PU2, P2, D1, D2, I1 and I2 and with regard to details on the support material, reference is made to the above statements.

The welded composite has the same good water vapor permeability and the same high liquid entry pressure as the unwelded porous membrane itself, in particular even in the immediate area of the weld (weld seam). The expression "the same good water vapor permeability" in the context of the present invention means that the water vapor permeability of the welded composite is in the range from 75% to 100%, preferably in the range from 80% to 100%, more preferably in the range from 90% to 100%, based on the water vapor permeability of the porous membrane. This applies to the entire welded composite, and especially in the area of the weld seam. The expression "the same high liquid entry pressure" in the context of the present invention means that the liquid entry pressure of the welded composite is in the range from 75% to 100%, preferably in the range from 80% to 100%, more preferably in the range from 90% to 100%, based on the liquid entry pressure of the porous membrane. This applies to the entire welded composite, and especially in the area of the weld seam.

The welded composite preferably likewise has, especially in the area of the weld seam, a water vapor permeability (WVP) which at 38° C. and 90% relative humidity according to DIN 53122 is more than 1000 [g/m$^2$*d]. Likewise, the welded composite preferably has, especially in the area of the weld seam, a watertightness (LEP) which is greater than 2 bar and preferably is in the range from 2 to 5 bar, more preferably in the range from 3 to 4 bar, determined according to DIN EN 20811.

In a preferred embodiment, the welded composite is used for the production of an article selected from the group consisting of clothing, shoes, boots, protective clothing, tents and tarpaulins. The welded composite according to the present invention is for example used in clothing, for example outdoor clothing, sports clothing such as sailing, climbing or ski clothing, rainwear, protective clothing, for headgear such as hats, caps or for shoes or boots. The welded composite is further used in tent tarpaulins, protective films/tarpaulins.

The present invention is illustrated further by the following embodiments and combinations of embodiments as indicated by the corresponding references and back-references. In particular, it should be emphasized that in every instance where a range of embodiments is given, for example in the context of an expression such as "the process according to any of embodiments 1 to 4", each embodiment in this range is deemed to be explicitly disclosed to those skilled in the art, i.e. the meaning of this expression is to be understood by those skilled in the art as synonymous with "the process according to any of embodiments 1, 2, 3, and 4".

1. A process for welding porous membranes, comprising:
   i) providing a porous membrane and a sheetlike support material;
   ii) at least partially superimposing porous membrane and sheetlike support material as per i) to obtain an at least partial superimposition region;
   iii) welding porous membrane and support material at least in a portion of the superimposition region as per ii) at a temperature in the range from 100 to 300° C., preferably in the range from 150 to 250° C., to obtain an at least partially welded composite of porous membrane and sheetlike support material.
2. The process according to embodiment 1, wherein the welding as per iii) is effected for a period of time in the range from 0.1 seconds to 10 minutes, preferably in the range from 0.5 seconds to 60 seconds, more preferably in the range from 1 to 10 seconds.
3. The process according to either of embodiments 1 and 2, wherein the welding as per iii) is effected under an atmosphere selected from protective gas, especially argon or nitrogen, air or lean air, preferably under air.
4. The process according to any of embodiments 1 to 3, wherein the welding as per iii) is effected at a pressure in the range from 1 to 10 bar, preferably in the range from 2 to 8 bar, more preferably in the range from 3 to 5 bar.
5. The process according to any of embodiments 1 to 4, wherein the welding as per iii) is effected at a temperature in the range from 150 to 250° C.
6. The process according to any of embodiments 1 to 5, wherein the porous membrane has an average thickness in the range from 5 to 150 μm, preferably in the range from 50 to 100 μm, more preferably in the range from 70 to 90 μm.
7. The process according to any of embodiments 1 to 6, wherein the porous membrane has pores having an average pore diameter of less than 2000 nm, preferably in the range from 0.001 μm to 0.8 μm, determined by means of Hg porosimetry in accordance with DIN 66133.
8. The process according to any of embodiments 1 to 7, wherein the material of the porous membrane comprises a thermoplastic elastomer, preferably selected from the group consisting of polyurethane elastomer, polyester elastomer, polyetherester elastomer, polyesterester elastomer, polyamide elastomer, polyetheramide elastomer, polystyrene elastomer, ethylene-vinyl acetate elastomer and mixtures of two or more of these elastomers, preferably polyurethane elastomer.
9. The process according to embodiment 8, wherein the material of the porous membrane comprises a polyurethane elastomer based on the following components:
   80% to 100% by weight of a mixture of at least one diol (D1) and at least one isocyanate (I1),
   0 to 20% by weight of at least one compound (C1) having at least two isocyanate-reactive groups; and wherein the porous membrane has pores having an average pore diameter in the range from 0.001 μm to 0.8 μm, determined by means of Hg porosimetry in accordance with DIN 66133.
10. The process according to embodiment 9, wherein the material of the porous membrane comprises a further polyurethane (PU2) based on at least one polyol (P2), at least one diol (D2) and at least one polyisocyanate (I2).
11. The process according to embodiment 9 or 10, wherein the compound (C1) is a polyol, preferably selected from the group of the divalent radicals of an oligosiloxane or polysiloxane of general formula I (I)

where Ak is $C_2$-$C_4$ alkylene and R is $C_1$-$C_4$ alkyl and each of p, q and q' is independently a number in the range from 0-50, with p more preferably being a number in the range from 1 to 50, more preferably in the range from 2 to 50.

12. The process according to any of embodiments 9 to 11, wherein the diol (D1) is selected from the group consisting of ethanediol, butanediol and hexanediol.

13. The process according to any of embodiments 9 to 12, wherein the polyisocyanate is selected from the group consisting of diphenylmethane diisocyanate (MDI), toluene diisocyanate (TDI) and hexamethylene diisocyanate (HDI).

14. The process according to any of embodiments 1 to 13, wherein the support material comprises a second porous membrane, the material of the second porous membrane comprising a thermoplastic elastomer selected from the group consisting of polyurethane elastomer, polyester elastomer, polyetherester elastomer, polyesterester elastomer, polyimide elastomer, polyetheramide elastomer, polystyrene elastomer, ethylene-vinyl acetate elastomer and mixtures of two or more of these elastomers, preferably polyurethane elastomer.

15. The process according to embodiment 14, wherein the second porous membrane has an average thickness in the range from 5 to 150 μm, preferably in the range from 50 to 100 μm, more preferably in the range from 70 to 90 μm.

16. The process according to either of embodiments 14 and 15, wherein the second porous membrane has pores having an average pore diameter of less than 2000 nm, preferably in the range from 0.001 μm to 0.8 μm, determined by means of Hg porosimetry in accordance with DIN 66133.

17. The process according to any of embodiments 14 to 16, wherein the material of the porous membrane as per i) and that of the second porous membrane comprise the same thermoplastic elastomer, preferably the same polyurethane elastomer.

18. A welded composite of a porous membrane and a support material, obtained or obtainable by the process according to any of embodiments 1 to 17.

19. The welded composite according to embodiment 18, wherein the water vapor permeability (WVP) at 38° C. and 90% relative humidity according to DIN 53122 is more than 1000 [g/m$^2$*d].

20. The welded composite according to embodiment 18 or 19, wherein the watertightness (LEP) is greater than 2 bar and preferably is in the range from 2 to 5 bar, more preferably in the range from 3 to 4 bar, determined according to DIN EN 20811.

21. A welded composite of a porous membrane and a support material, wherein the porous membrane has an average thickness in the range from 5 to 150 μm, preferably in the range from 50 to 100 μm, more preferably in the range from 70 to 90 μm.

22. The welded composite according to embodiment 21, wherein the porous membrane has pores having an average pore diameter of less than 2000 nm, preferably in the range from 0.001 μm to 0.8 μm, determined by means of Hg porosimetry in accordance with DIN 66133.

23. The welded composite according to embodiment 21 or 22, wherein the material of the porous membrane comprises a thermoplastic elastomer, preferably selected from the group consisting of polyurethane elastomer, polyester elastomer, polyetherester elastomer, polyesterester elastomer, polyamide elastomer, polyetheramide elastomer, polystyrene elastomer, ethylene-vinyl acetate elastomer and mixtures of two or more of these elastomers, preferably polyurethane elastomer.

24. The welded composite according to embodiment 23, wherein the material of the porous membrane comprises a polyurethane elastomer based on the following components:
   80% to 100% by weight of a mixture of at least one diol (D1) and at least one isocyanate (I1),
   0 to 20% by weight of at least one compound (C1) having at least two isocyanate-reactive groups; and wherein the porous membrane has pores having an average pore diameter in the range from 0.001 μm to 0.8 μm, determined by means of Hg porosimetry in accordance with DIN 66133.

25. The welded composite according to embodiment 24, wherein the material of the porous membrane comprises a further polyurethane (PU2) based on at least one polyol (P2), at least one diol (D2) and at least one polyisocyanate (I2).

26. The welded composite according to embodiment 24 or 25, wherein the compound (C1) is a polyol, preferably selected from the group of the divalent radicals of an oligosiloxane or polysiloxane of general formula I $$\text{-[Ak-O]}_q\text{-Ak-Si(R}_2)\text{—[O—Si(R}_2)]_p\text{—O—Si(R}_2)\text{-Ak-[O-Ak]}_{q'}\text{-} \quad (I)$$

where Ak is $C_2$-$C_4$ alkylene and R is $C_1$-$C_4$ alkyl and each of p, q and q' is independently a number in the range from 0-50, with p more preferably being a number in the range from 1 to 50, more preferably in the range from 2 to 50.

27. The welded composite according to any of embodiments 24 to 26, wherein the diol (D1) is selected from the group consisting of ethanediol, butanediol and hexanediol.

28. The welded composite according to any of embodiments 24 to 27, wherein the polyisocyanate is selected from the group consisting of diphenylmethane diisocyanate (MDI), toluene diisocyanate (TDI) and hexamethylene diisocyanate (HDI).

29. The welded composite according to any of embodiments 24 to 28, wherein the support material comprises a second porous membrane, the material of the second porous membrane comprising a thermoplastic elastomer selected from the group consisting of polyurethane elastomer, polyester elastomer, polyetherester elastomer, polyesterester elastomer, polyimide elastomer, polyetheramide elastomer, polystyrene elastomer, ethylene-vinyl acetate elastomer and mixtures of two or more of these elastomers, preferably polyurethane elastomer.

30. The welded composite according to embodiment 29, wherein the second porous membrane has an average thickness in the range from 5 to 150 μm, preferably in the range from 50 to 100 μm, more preferably in the range from 70 to 90 μm.

31. The welded composite according to either of embodiments 29 and 30, wherein the second porous membrane has pores having an average pore diameter of less than 2000 nm, preferably in the range from 0.001 μm to 0.8 μm, determined by means of Hg porosimetry in accordance with DIN 66133.

32. The welded composite according to any of embodiments 29 to 31, wherein the material of the porous membrane as per i) and that of the second porous membrane comprise the same thermoplastic elastomer, preferably the same polyurethane elastomer.

33. The welded composite according to any of embodiments 21 to 32, wherein the water vapor permeability (WVP) at 38° C. and 90% relative humidity according to DIN 53122 is more than 1000 [g/m²*d].
34. The welded composite according to any of embodiments 21 to 33, wherein the watertightness (LEP) is greater than 2 bar and preferably is in the range from 2 to 5 bar, more preferably in the range from 3 to 4 bar, determined according to DIN EN 20811.
35. The use of a welded composite according to any of embodiments 18 to 20 or of a welded composite according to any of embodiments 21 to 34 for the production of an article selected from the group consisting of clothing, shoes, boots, protective clothing, tents and tarpaulins.

CITED LITERATURE

U.S. Pat. No. 3,953,566,
U.S. Pat. No. 3,962,153
U.S. Pat. No. 5,562,977
JP 5005276
US 2015/0230563
"Kunststoffhandbuch [Plastics Handbook], 7, Polyurethane [Polyurethanes]", Carl Hanser Verlag, 3rd edition 1993, section 3.1
"Kunststoffhandbuch" [Plastics Handbook], 7, Carl Hanser Verlag, 1966, pages 103-113.

EXAMPLES

The following examples serve to illustrate the invention, but are not restrictive with respect to the subject matter of the invention.
1. Preparation of the Polyurethane (Hard Phase)
1.1 Substances
The following substances were used:

| Abbreviation | Compound | Molecular weight [g/mol] |
|---|---|---|
| Iso 1 | 4,4'-methylenediphenylene diisocyanate | 250.26 g/mol |
| CE 2 | butane-1,4-diol | 90.12 g/mol |

1.2 Synthesis of the Polyurethane (Hard Phase Type 1)
Chain extender CE2 was dispensed into a 2 l can. Isocyanate Iso1 was subsequently added under gentle stirring and the reaction was carefully heated to 70° C. under air. The mixture was then stirred until a temperature of 90° C. was reached. The reaction mixture was poured into a flat dish and heated at 125° C. for 10 minutes on a hotplate. The slab obtained was heat-treated in a heating oven at 80° C. for 15 minutes.
The material obtained was cut into pieces and ground to give pellets.
1.3 Composition of the Material Produced

| Isocyanate (Iso) | Amount of Iso [g] | Diol (CE) | Amount of CE [g] | Total amount [g] |
|---|---|---|---|---|
| Iso 1 | 441.1 | CE 2 | 158.9 | 600 |

2. Production of the Membranes
2.1 Abbreviations and Compounds:
NMP N-methylpyrrolidone
GLY glycerol
LEP liquid entry pressure
WVP water vapor permeability 2.2 Test Methods
The liquid entry pressure of the membranes was determined in accordance with DIN EN 20811 using a pressure cell having a diameter of 60 mm with ultrapure water (salt-free water, filtered through a Millipore UF system) up to 4.0 bar (40 000 mm water column). The liquid entry pressure LEP is defined as the pressure at which the liquid water starts to permeate through the membrane. A high LEP allows the membrane to withstand a high water column (liquid).
The water vapor permeability (WVP) was determined using a cup method at 38° C. and 90% relative humidity in accordance with DIN 53122. High WVP values were desirable and permitted high water vapor flow rates. Tensile tests for modulus of elasticity and elongation at break were performed in accordance with DIN 53455/ISO 527.
Tensile properties were characterized in accordance with ISO 527-3.
2.3 Production of Porous Membrane with N-Methylpyrrolidone as Polymer Solvent
In a three-neck flask equipped with a magnetic stirrer, 81 ml of N-methylpyrrolidone 1, 10 g of glycerol as second additive and 19 g of TPU polymer as per 1. were mixed together. The mixture was heated to 60° C. with gentle stirring until the homogeneous, clear, viscous solution thereof was present, which was degassed at room temperature overnight. Clear and transparent polymer solutions were obtained.
The polymer solution was subsequently heated again to 60° C. for 2 h and then spread at 60° C. onto a glass plate with a casting knife (150 microns), using an Erichsen coating machine at a speed of 5 mm/min. The membrane film was left to stand for 30 seconds, subsequently followed by immersion in a water bath at 25° C. for 10 minutes. After detaching the membrane from the glass plate, the membrane was transferred to a water bath for 12 hours. After multiple wash steps with water, the membrane was stored under humid conditions until characterization with respect to LEP and WVP. Table 1 summarizes the membrane properties.

TABLE 1

Compositions and properties of the membranes produced; thickness in [μm], LEP in [bar], WVP in [g/m²*d], modulus of elasticity [MPa], elongation at break [%], Tg in [° C.].

|  | TPU | Tg | Thickness | LEP | WVP |
|---|---|---|---|---|---|
| Example 1 | BUMDI | 106 | 80 | 4 | 1220 |

3. Welding
Two membranes as per section 1, example 1 were welded under air at 120° C. and a pressure of 3 bar for a period of time of three seconds, with a semiautomatic pulse welding machine (film welder) of the HPL 630 A type from Hawo Gerätebau GmbH, D-74847 Obrigheim being used and a welded membrane composite with a weld seam having a width of 3.5 mm being obtained. The welded membrane composite had a thickness of 120 μm in the area of the weld seam and was characterized in this area with respect to LEP and WVP. Table 3 shows the results of the characterization in comparison for the membrane of example 1 from section 2 and the welded membrane composite.

TABLE 3

Composition and properties of the membrane as per example 1 and of the welded composite; thickness in [μm], LEP in [bar], WVP in [g/m²*d], Tg in [° C.].

|  | TPU | Tg | Thickness | LEP | WVP |
|---|---|---|---|---|---|
| Example 1 | BUMDI | 106 | 80 | 4 | 1220 |
| Welded membrane composite | BUMDI | 106 | 120 | 4 | 1220 |

The welded membrane composite exhibited the same good water vapor permeability and the same high liquid entry pressure as the unwelded membrane as per example 1. When determining the tensile properties, the seam of the welded membrane composite had a breaking stress of 1.5 MPa with an elongation at break of 8%.

Figure 1:
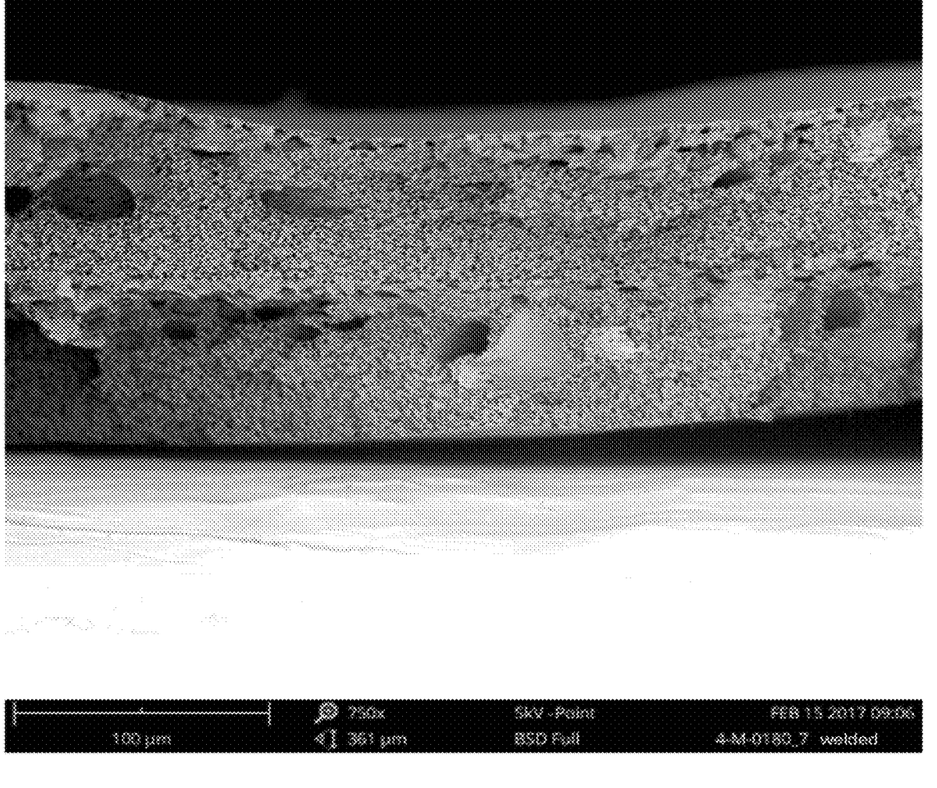
FIG. 1 shows an SEM image of the cross-sectional area of the welded composite (membrane composite) in the area of the weld seam.

The welded membrane composite was also examined by means of scanning electron microscopy (SEM). FIG. 1 is an SEM image of the cross-sectional area of the membrane composite in the area of the weld seam.

The invention claimed is:

1. A process for welding porous membranes, the process comprising:
    i) providing a first porous membrane and a second porous membrane;
    ii) at least partially superimposing the first and second porous membranes to obtain an at least partial superimposition region;
    iii) welding the first and second porous membranes at least in a portion of the at least one superimposition region at a temperature in the range from 100 to 300° C. and at a pressure in the range from 1 to 10 bar to obtain an at least partially welded composite of the first and second porous membranes;
    wherein a material of the first and second porous membranes comprises at least one thermoplastic elastomer selected from the group consisting of a polyurethane elastomer, a polyester elastomer, a polyetherester elastomer, a polyesterester elastomer, a polyamide elastomer, a polyetheramide elastomer, a polystyrene elastomer, and an ethylene-vinyl acetate elastomer
    the first and second porous membranes have pores having an average pore diameter of less than 2000 nm, determined by means of Hg porosimetry in accordance with DIN 66133 and
    said first porous membrane and said second porous membrane are at least partially superimposed and are joined to one another in the form of a weld seam at least in a portion of said at least one superimposition region,
    wherein said first and second porous membranes each have a pore size distribution between a first surface and a second surface of the respective membranes, wherein the pore size distribution is a gradient wherein a ratio of a pore diameter of pores at or close to the first surface to a pore diameter of pores at or close to the second surface is 1:5 to 1:10,000, and
    an area of said weld seam has a water vapor permeability of 75% to 100% of a water vapor permeability of said first porous membrane.

2. The process according to claim 1, wherein the welding is carried out for a period of time in the range from 0.1 seconds to 10 minutes.

3. The process according to claim 1, wherein the welding is carried out under an atmosphere selected from protective gas, air and lean air.

4. The process according to claim 1, wherein the welding is carried out at a temperature in the range from 150 to 250° C.

5. The process according to according to claim 1, wherein the first porous membrane has an average thickness in the range from 5 to 150 μm.

6. The process according to according to claim 1, wherein the first porous membrane has pores having an average pore diameter in the range from 0.001 μm to 0.8 μm, determined by means of Hg porosimetry in accordance with DIN 66133.

7. The process according to claim 1, wherein the material of the first porous membrane comprises a polyurethane elastomer based on the following components:
    80% to 100% by weight of a mixture of at least one diol (D1) and at least one isocyanate (II),
    0 to 20% by weight of at least one compound (C1) having at least two isocyanate-reactive groups; and
    wherein the first porous membrane has pores having an average pore diameter in the range from 0.001 μm to 0.8 μm, determined by means of Hg porosimetry in accordance with DIN 66133.

8. The process according to claim 1, wherein the second porous membrane has an average thickness in the range from 5 to 150 μm and/or has pores having an average pore diameter tin the range from 0.001 μm to 0.8 μm, determined by means of Hg porosimetry in accordance with DIN 66133.

9. The process according to claim 8, wherein the material of the first porous membrane and the material of the second porous membrane comprise the same thermoplastic elastomer.

10. The process according to claim 1, wherein an area of said weld seam has a liquid entry pressure of 75% to 100% of a liquid entry pressure of said first porous membrane.

* * * * *